UNITED STATES PATENT OFFICE.

FRIEDRICH VALENTINER, OF LEIPSIC, GERMANY.

PROCESS OF MAKING ACETOPHENONPHENETIDIN.

SPECIFICATION forming part of Letters Patent No. 558,863, dated April 21, 1896.

Application filed October 25, 1895. Serial No. 566,903. (No specimens.)

*To all whom it may concern:*

Be it known that I, FRIEDRICH VALENTINER, a subject of the Emperor of Germany, residing at Leipsic, Plagwitz, in the German Empire, have invented certain new and useful Improvements in Processes for the Production of Acetophenonphenetidin; and I do hereby declare that the following is a full, clear, and exact description of the invention, such as will enable others skilled in the art to which it appertains to make and use the same.

To carry my process into effect, a mixture of acetophenon and paraphenetidin in the proportions of their molecular weights is heated in a reflex cooler or other means for withdrawing water. Upon cooling the product of the reaction congeals in the form of crystals and the acetophenonphenetidin can be purified by dissolving in alcohol and recrystallizing. The reaction is as follows:

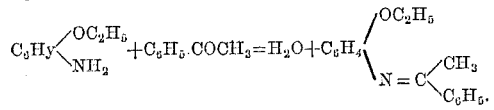

The acetophenonphenetidin is a compound crystallizing in beautiful lemon-yellow needles, easily soluble in alcohol, also in ether and vinegar, but not soluble in water. It melts at 88° and easily combines with two atoms of bromin to form a dibromacetophenonphenetidin.

The acetophenonphenetidin is used as an antithermic remedy in pharmacy.

What I claim, and desire to secure by Letters Patent, is—

The process of producing acetophenonphenetidin which consists in heating together acetophenon and paraphenetidin, substantially as described.

In witness whereof I have hereunto set my hand in presence of two witnesses.

FRIEDRICH VALENTINER.

Witnesses:
WILHELM SCHWICTHAL,
W. HAUPT.